(12) United States Patent
Moon et al.

(10) Patent No.: US 9,947,363 B2
(45) Date of Patent: Apr. 17, 2018

(54) METHOD FOR VOICE RECORDING AND ELECTRONIC DEVICE THEREOF

(71) Applicant: Samsung Electronics Co., Ltd., Suwon-si, Gyeonggi-do (KR)

(72) Inventors: Joo-Hyun Moon, Daegu (KR); Eung-Ha Kim, Gumi-si (KR); Tai-Hyung Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/467,481

(22) Filed: Aug. 25, 2014

(65) Prior Publication Data

US 2015/0055798 A1    Feb. 26, 2015

(30) Foreign Application Priority Data

Aug. 26, 2013    (KR) .................. 10-2013-0101216

(51) Int. Cl.

| | |
|---|---|
| *H04R 3/00* | (2006.01) |
| *G11B 20/10* | (2006.01) |
| *H04R 1/40* | (2006.01) |
| *G01S 3/80* | (2006.01) |
| *H04M 1/656* | (2006.01) |
| *H04M 1/725* | (2006.01) |
| *H04M 1/60* | (2006.01) |

(52) U.S. Cl.
CPC ...... *G11B 20/10527* (2013.01); *G01S 3/8006* (2013.01); *H04M 1/6041* (2013.01); *H04M 1/656* (2013.01); *H04M 1/72522* (2013.01); *H04R 1/406* (2013.01); *H04R 3/005* (2013.01); *G11B 2020/10537* (2013.01); *H04R 2201/401* (2013.01); *H04R 2499/11* (2013.01)

(58) Field of Classification Search
CPC ........... H04R 2460/05; H04R 2460/07; H04R 2460/13; H04R 25/305; H04R 25/40; H04R 25/405; H04R 25/55; H04R 25/606; H04R 25/70; H04R 29/002; H04R 3/00; H04R 3/007; G10L 19/008; G10L 25/78; G10L 2021/02165; G10L 21/0216; G10L 21/0232; G10L 15/22; G10L 2021/02082; G10L 21/02; G10L 25/84; G10L 15/25; G10L 19/00
USPC ..... 381/92, 119; 379/88.03; 348/370, 231.4; 704/275; 700/94
See application file for complete search history.

(56) References Cited

U.S. PATENT DOCUMENTS

2008/0056457 A1* 3/2008 Hsu .................. H04M 1/6008
                                                           379/88.03
2008/0146289 A1    6/2008 Korneluk et al.
(Continued)

FOREIGN PATENT DOCUMENTS

| | | |
|---|---|---|
| GB | 2 327 012 A | 1/1999 |
| JP | 2011-165056 A | 8/2011 |

(Continued)

*Primary Examiner* — Lun-See Lao
(74) *Attorney, Agent, or Firm* — Jefferson IP Law, LLP

(57) ABSTRACT

A method for voice recording and an electronic device thereof are provided. The method includes determining a voice recording mode from among a plurality of voice recording modes, determining a voice beamforming direction according to the determined voice recording mode, and recording voice signals based on the determined voice beamforming direction.

13 Claims, 13 Drawing Sheets

(56) References Cited

U.S. PATENT DOCUMENTS

| | | | |
|---|---|---|---|
| 2008/0259731 A1* | 10/2008 | Happonen | G10K 11/34 367/121 |
| 2010/0302401 A1 | 12/2010 | Oku et al. | |
| 2011/0013075 A1* | 1/2011 | Kim | H04N 5/602 348/370 |
| 2011/0038489 A1* | 2/2011 | Visser | G01S 3/8006 381/92 |
| 2013/0132845 A1 | 5/2013 | Tammi et al. | |
| 2013/0342731 A1* | 12/2013 | Lee | H04N 5/23293 348/231.4 |
| 2014/0362253 A1* | 12/2014 | Kim | H04N 5/262 348/231.4 |
| 2016/0189728 A1* | 6/2016 | Chen | G10L 21/0208 704/246 |

FOREIGN PATENT DOCUMENTS

| | | |
|---|---|---|
| JP | 2011211330 A | 10/2011 |
| KR | 20090090861 A | 8/2009 |
| KR | 20090120669 A | 11/2009 |

* cited by examiner

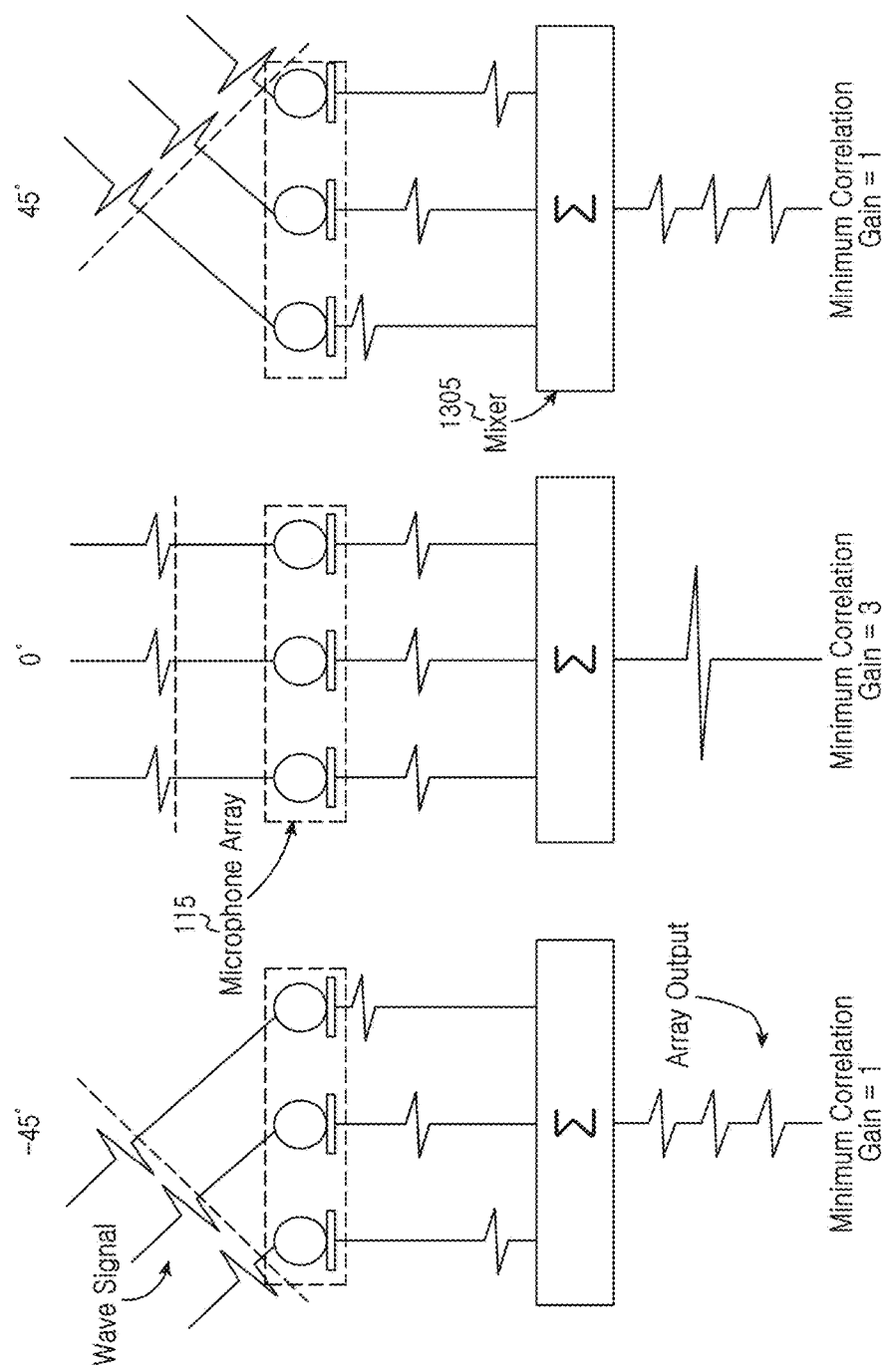

METHOD FOR VOICE RECORDING AND ELECTRONIC DEVICE THEREOF

CROSS-REFERENCE TO RELATED APPLICATION(S)

This application claims the benefit under 35 U.S.C. § 119(a) of a Korean patent application filed on Aug. 26, 2013 in the Korean Intellectual Property Office and assigned Serial number 10-2013-0101216, the entire disclosure of which is hereby incorporated by reference.

TECHNICAL FIELD

The present disclosure relates to a method for voice recording and an electronic device thereof.

BACKGROUND

Electronic devices, such as a portable terminal, a mobile terminal, and a smart phone, generally provide functions, such as a phone call function, a voice recording function, and a video recording function. In order to support the functions, such as the phone call function, the voice recording function, and the video recording function, the electronic devices necessarily include a microphone for converting sound into electrical signals.

In the electronic devices, at least one microphone is used for the phone call function and the video recording function.

In the past, regardless of a situation in which a user records her or his own voice, records a content of a dialog with a counterpart, and/or records only voice from a communication partner, voice signals and ambient noise are received through dedicated microphones and voice recording is performed after the ambient noise is eliminated.

In order words, voice recording modes suitable for various environments are not provided when voice recording is performed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for voice recording which control a sound beamforming direction for recording a sound according to a voice recording mode in an electronic device.

Another aspect of the present disclosure is to provide a method and apparatus for providing voice recording modes for respective situations using a User Interface (UI) and a microphone array for voice recording suitable for the respective situations.

In accordance with an aspect of the present disclosure, a method for voice recording in an electronic device including a plurality of microphones is provided. The method includes receiving a selection of a voice recording mode, determining a voice beamforming direction according to the selection, and recording voice signals based on the determined voice beamforming direction.

In accordance with another aspect of the present disclosure, an apparatus for voice recording in an electronic device is provided. The apparatus includes a plurality of microphones, a mode selection unit configured to receive a selection of a voice recording mode, a sound beamforming setting unit configured to determine a voice beamforming direction according to the selection, and a control unit configured to record voice signals based on the determined voice beamforming direction.

In accordance with another aspect of the present disclosure, an electronic device including a plurality of microphones is provided. The electronic device includes at least one processor configured to execute at least one program, and a memory configured to store the at least one program, wherein the at least one program includes instructions for receiving a selection of a voice recording mode, determining a voice beamforming direction according to the selection, and recording voice signals based on the determined voice beamforming direction, and wherein the plurality of voice recording modes respectively correspond to a plurality of voice beamforming directions determined by a microphone array that includes the plurality of microphones.

In accordance with another aspect of the present disclosure, an electronic device for recording sound. The electronic device includes a microphone array including a plurality of microphones, a controller configured to determine a voice recording mode from among a plurality of voice recording modes, to determine a voice beamforming direction to apply to the microphone array according to the determined voice recording mode, and to record voice signals based on the determined voice beamforming direction, and a display unit configured to display information corresponding to the determined voice beamforming direction, wherein the plurality voice recording modes respectively correspond to a plurality of voice beamforming directions determined by a microphone array that includes the plurality of microphones.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 13A, 13B, and 13C illustrate examples of processing voice signals according to a voice recording mode according to an embodiment of the present disclosure.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus for recording voice in an electronic device according to an embodiment of the present disclosure will be described below.

Figure 1:
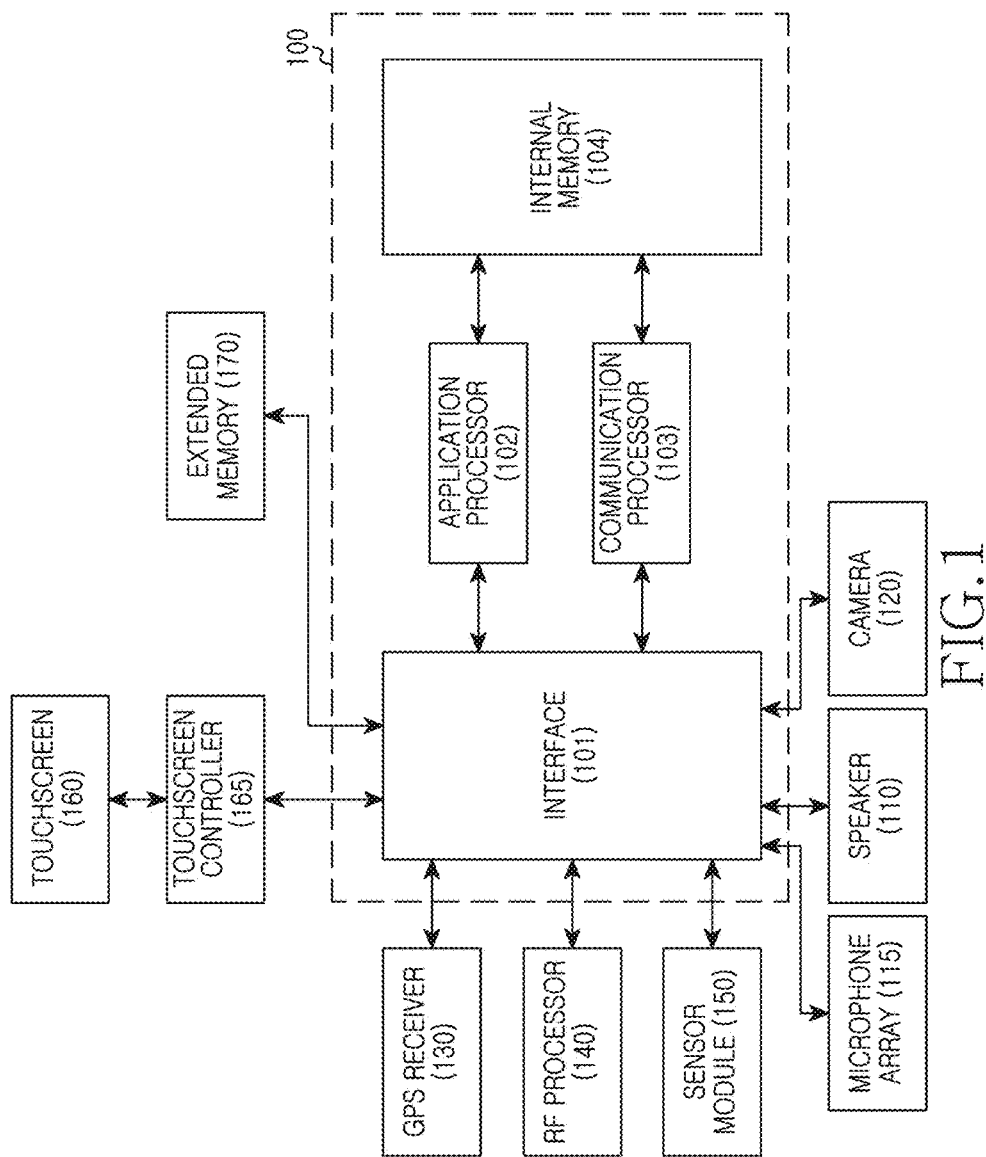
FIG. 1 illustrates a block configuration diagram of an electronic device according to an embodiment of the present disclosure.

FIG. 1 illustrates a configuration diagram of an electronic device according to an embodiment of the present disclosure.

Examples of the electronic device may include a portable terminal, a mobile terminal, a mobile pad, a media player, a tablet computer, a handheld computer, or a Personal Digital Assistant (PDA), a server, a personal computer, and any other similar and/or suitable electronic device. In addition, the electronic device may be any one electronic device including a device having two or more functions from among the above-described devices.

Referring to FIG. 1, the electronic device includes a controller 100, a speaker 110, a microphone array 115, a camera 120, a Global Positioning System (GPS) receiver 130, a Radio Frequency (RF) processor 140, a sensor module 150, a touchscreen 160, a touchscreen controller 165, and an extended memory 170.

The controller 100 may include an interface 101, at least one processor, including an application processor 102 and a communication processor 103, and an internal memory 104. In some cases, the controller 100 will also be referred to as a processor. The interface 101, the application processor 102, the communication processor 103, and the internal memory 104 may be implemented as separate components and/or be integrated on at least one integrated circuit.

According to an embodiment of the present disclosure, the extended memory 170 and/or the internal memory 104 may store voice and/or voice data on which beamforming has been performed through the microphone array 115 under the control of the application processor 102.

The application processor 102 executes various software programs to perform various functions for the electronic device, and the communication processor 103 performs processing and control for voice communication and data communication. In addition to these general functions, the application processor 102 and the communication processor 103 execute a specific software module, i.e., an instruction set, stored in the extended memory 170 and/or the internal memory 104 to perform various specific functions corresponding to the software module. That is, the application processor 102 and the communication processor 103 may perform voice recording methods of the electronic device according to an embodiment in cooperation with software modules stored in the extended memory 170 and/or the internal memory 104.

Figure 4:
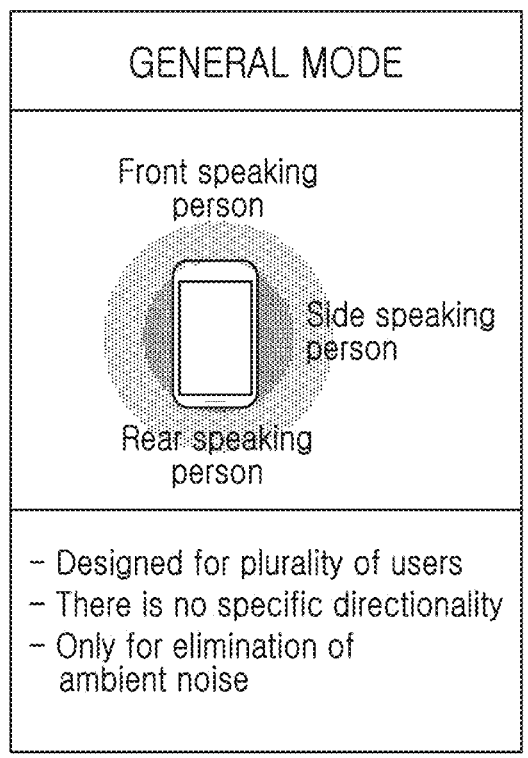
FIG. 4 illustrates a User Interface (UI) corresponding to a general mode of voice recording modes according to an embodiment of the present disclosure.
Figure 5:
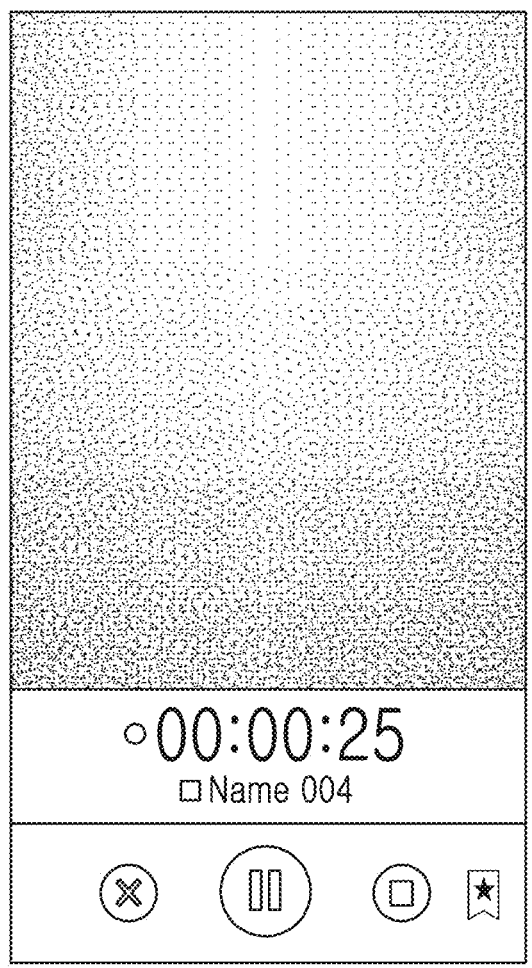
FIG. 5 illustrates a UI corresponding to a general mode of voice recording modes according to an embodiment of the present disclosure.
Figure 6:
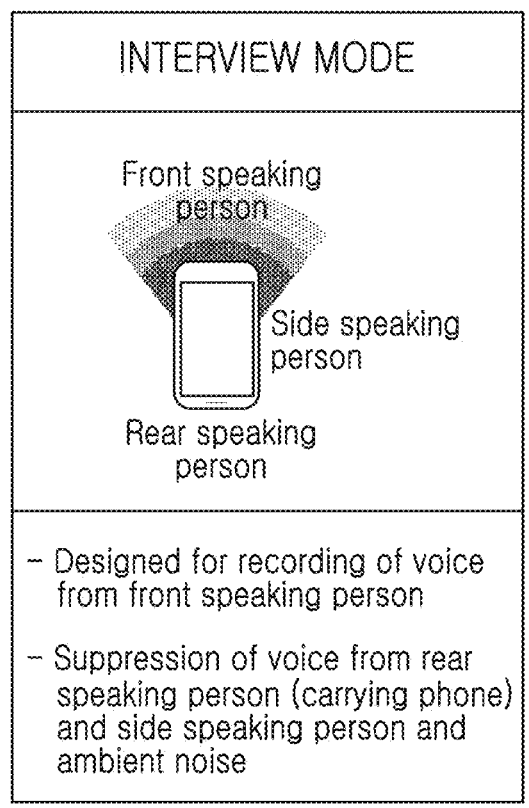
FIG. 6 illustrates a UI corresponding to an interview mode of voice recording modes according to an embodiment of the present disclosure.
Figure 7:
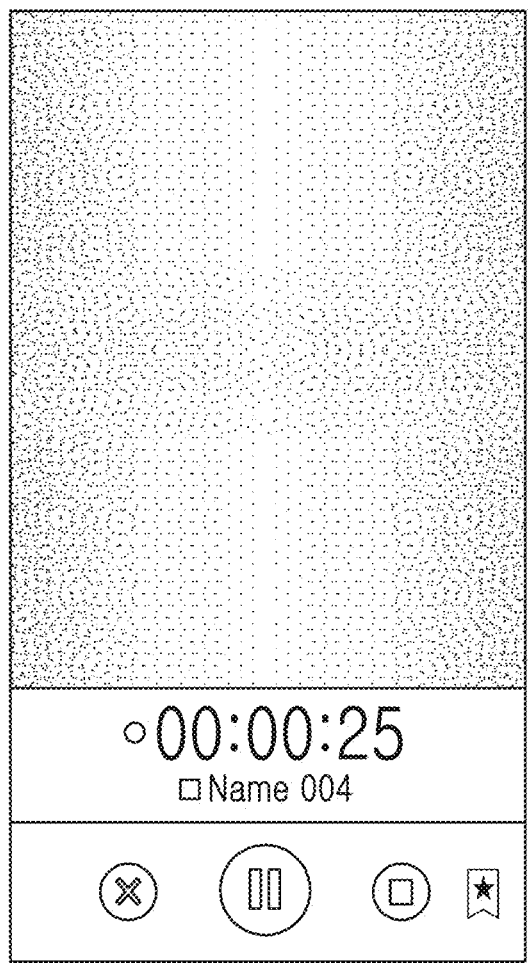
FIG. 7 illustrates a UI corresponding to an interview mode of voice recording modes according to an embodiment of the present disclosure.
Figure 8:
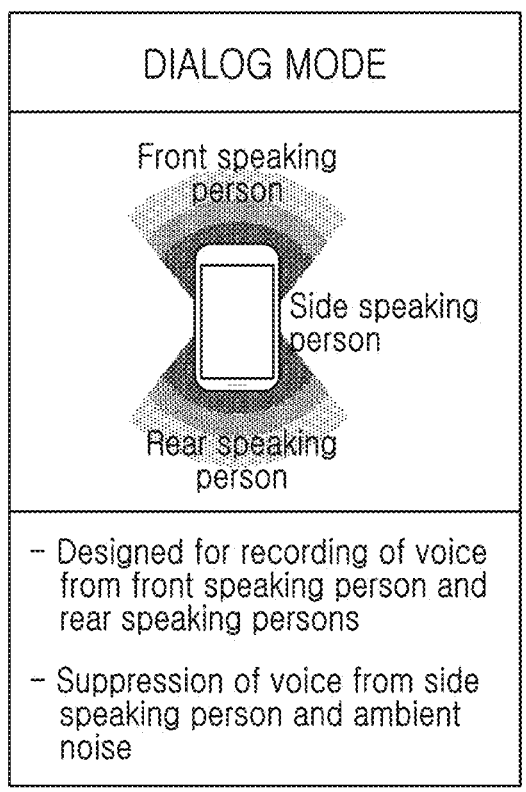
FIG. 8 illustrates a UI corresponding to a dialog mode of voice recording modes according to an embodiment of the present disclosure.
Figure 9:
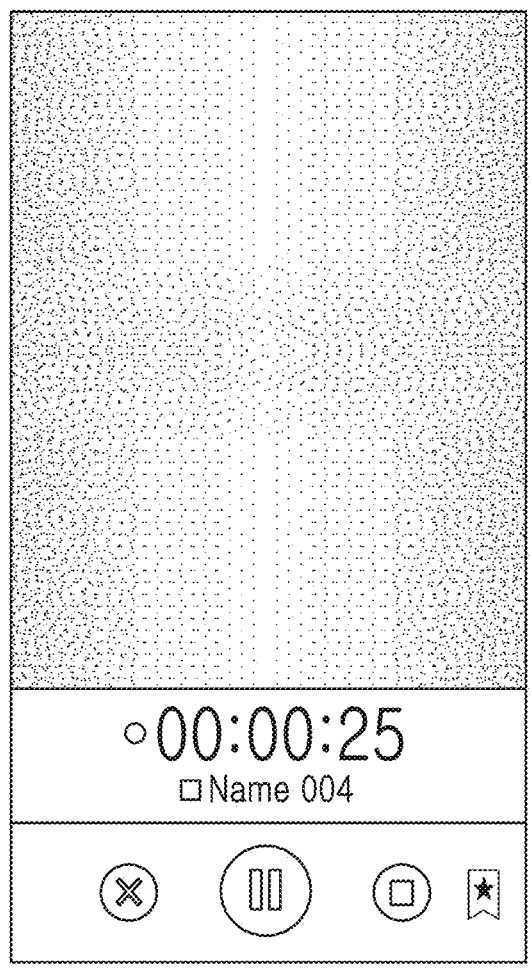
FIG. 9 illustrates a UI corresponding to a dialog mode of voice recording modes according to an embodiment of the present disclosure.

For example, the application processor 102 may select a voice recording mode, determine a voice beamforming direction based on the selected voice recording mode, displays a visual effect corresponding to the determined voice beamforming direction, and records voice signals according to the voice recording mode. For example, when a general mode is selected, a beamforming direction may be determined so as to receive voice signals in all directions, as illustrated in FIGS. 4 and 5. In this case, a visual effect for the voice beamforming direction corresponding to the general mode may be displayed. When an interview mode is selected, the beamforming direction may be set to the front direction of the microphone and a visual effect for the voice beamforming direction corresponding to the interview mode may be displayed as illustrated in FIGS. 6 and 7. In addition, when a dialog mode is selected, the beamforming direction may be set to the front and rear directions of the microphone and a visual effect for the voice beamforming direction corresponding to the dialog mode may be displayed as illustrated in FIGS. 8 and 9.

The interface 101 connects the touchscreen controller 165 to the extended memory 170 of the electronic device.

The sensor module 150 is connected to the interface 101 to facilitate various functions. For example, the sensor module 150 may include a motion sensor (not shown) and an optical sensor (not shown) that are connected to the interface 101 to enable detection of a motion of the electronic device and light from the outside. In addition, other sensors, such as a positioning system, a temperature sensor, a biosensor, and any other similar and/or suitable sensor may be connected to the interface 101 to perform relevant functions.

The camera module unit 120 is connected to the sensor module 150 through the interface 101 to perform camera functions such as photographing and video clip recording.

The RF processor 140 performs a communication function. For example, the RF processor 140 converts RF signals into baseband signals under the control of the communication processor 103 and provides the same to the communication processor 103, and/or converts baseband signals from the communication processor 103 into RF signals and then transmits the RF signals. In this case, the communication processor 103 processes baseband signals according to various communication methods. For example, the communication methods may include, but are not limited to, a Global System for Mobile Communication (GSM) communication method, an Enhanced Data GSM Environment (EDGE) communication method, a Code Division Multiple Access (CDMA) communication method, a Wideband-CDMA (W-CDMA) communication method, a Long Term Evolution (LTE) communication method, an Orthogonal Frequency Division Multiple Access (OFDMA) communication method, a Wireless Fidelity (WiFi) communication method, a Wireless Interoperability for Microwave Access (WiMax) network, a Bluetooth communication method, and/or any other similar and/suitable communication method.

The speaker 110 may perform audio stream input/output functions such as voice recognition, voice replication, digital recording, and phone functions.

In a case of having a plurality of speakers arranged as in the microphone array 115, the electronic device may identify speaking persons according to directions of the speaking persons and output sound according to the directions of the speaking persons when outputting voice during recording.

The microphone array 115 may perform audio stream input functions, such as voice recognition, voice replication, digital recording, and phone functions. For example, the microphone array 115 may convert a voice signal into an electrical signal. According to an embodiment of the present disclosure, the microphone array 115 may include a plurality of microphones and beamforming may be performed through the microphone array 115. According to an embodiment of the present disclosure, the plurality of microphones may include at least one microphone mounted on an upper end of a front surface of the electronic device and at least one microphone mounted on a lower end of the front surface of the electronic device. In an embodiment of the present disclosure, the positions of the plurality of microphones are not fixed on the upper end and the lower end of the electronic device, and the microphones may be located at any suitable position for configuration of the microphone array 115.

Voice beamforming may be used for a technology of tracking a direction of a sound source. As the technology of tracking a direction of a sound source, one of a method using a Time Difference Of Arrival (TDOA), a method using a steered beamformer, and a method using high resolution spectrum estimation may be applied.

Although not illustrated, an attachable/detachable earphone, an ear phone, a head phone, a head set, and/or any suitable sound producing and/or sound receiving device may be connected to the electronic device through an external port.

The touchscreen controller 165 may be connected to the touchscreen 160. The touchscreen 160 and the touchscreen controller 165 may detect a touch, a motion, or a stop thereof by using multi-touch detection technologies including a proximity sensor array and/or other elements, as well as capacitive, resistive, infrared and surface acoustic wave technologies for determining at least one touch point on the touchscreen 160.

The touchscreen 160 provides input/output interfaces between the electronic device and a user. That is, the touchscreen 160 receives a touch input of the user and provides information on the touch input to the electronic device. In addition, the touchscreen 160 may display an output from the electronic device to the user. That is, the touchscreen 160 displays a visual output to the user. The visual output may be represented by a text, a graphic, a video, or a combination thereof.

The touchscreen 160 may use various display technologies. For example, the touchscreen 160 may be, but is not limited to, a Liquid Crystal Display (LCD) technology, a Light Emitting Diode (LED) technology, a Light emitting Polymer Display (LPD) technology, an Organic Light Emitting Diode (OLED) technology, an Active Matrix Organic Light Emitting Diode (AMOLED) technology, a Flexible LED (FLED) technology, or any other similar and/or suitable display technology.

The GPS receiver 130 converts a signal received from a satellite into information such as a location, a speed and/or a time. For example, a distance between a satellite and the GPS receiver 130 corresponds to the product of the velocity of light and a signal propagation time. The accurate locations of three satellites and distances therefrom are calculated and the location of the electronic device is measured based on well-known triangulation techniques.

The extended memory 170 and/or the internal memory 104 may include at least one Random-Access Memory (RAMs) such as magnetic disk storage devices, at least one nonvolatile memory, at least one optical storage device, and/or at least one flash memory, for example, NAND flash memories or NOR flash memories.

The extended memory 170 and/or the internal memory 104 stores software. Software components include an Operating System (OS) software module, a communication software module, a graphic software module, a User Interface (UI) software module, a Motion Picture Experts Group (MPEG) module, a camera software module, and at least one application software module. Also, since the module that is a software component may be represented as a set of instructions, the module may be referred to as an instruction set. The module may also be referred to as a program.

The OS software includes various software components for controlling general system operation. For example, general system operation controls may include memory control/management, storage hardware and/or device control/management, and power control/management. The OS module also performs a function for facilitating smooth communication between various hardware elements and/or devices and software elements and/or modules.

The communication software module may enable communication with other electronic devices, such as a computer, a server and/or a portable terminal, through the RF processor 140. Furthermore, the communication software module is configured to have a protocol architecture corresponding to a relevant communication method.

The graphic software module includes various software components for providing and displaying graphics on the touchscreen 160. The graphics include texts, web pages, icons, digital images, videos, and animations.

The UI software module includes various software components associated with a UI. Through the UI module, the electronic device provides information about how the state of the UI is changed and/or information about under what condition the state of a UI is changed.

The camera software module includes camera-related software components that enable camera-related processes and functions. The application module includes a browser application including a rendering engine, an e-mail application, an instant message application, a word processing application, a keyboard emulation application, an address book application, a touch list application, a widget application, a Digital Right Management (DRM) application, a voice recognition application, a voice replication application, a position determining function application, a Location-Based Service (LBS) application, and the like. The memory 170 or 104 may include an additional module and/or instructions besides the above-described modules. If needed, the memory may not use some modules and/or instructions.

According to an embodiment of the present disclosure, the application module may include instructions (see FIG. 11) for voice recording. For example, the application module may include instructions for selecting a voice recording mode, determining a voice beamforming direction based on the selected voice recording mode, displaying a visual effect corresponding to the determined voice beamforming direction, and recording voice signals according to the voice recording mode.

Figure 2:
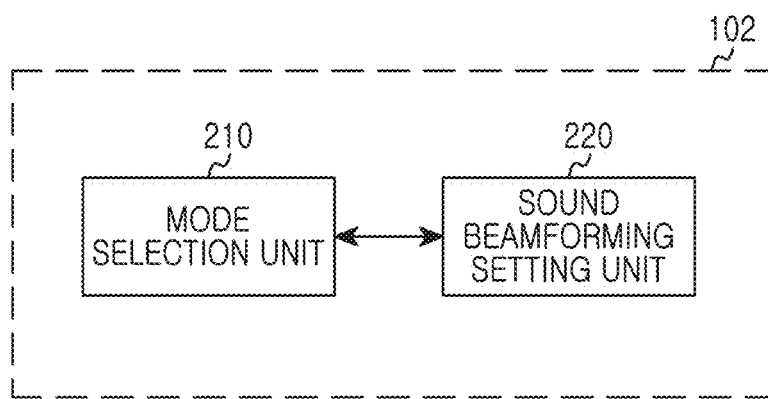
FIG. 2 illustrates a block configuration diagram of a processor according to an embodiment of the present disclosure.

FIG. 2 illustrates a block configuration diagram of an application processor according to an embodiment of the present disclosure.

Referring to FIG. 2, the application processor 102 may include a mode selection unit 210 and a sound beamforming setting unit 220.

The mode selection unit 210 may select a voice recording mode that is one of a general mode, an interview mode, a dialog mode, and a voice memo mode (see FIG. 3) according to a user's input. Information about a selected voice recording mode may be provided to the sound beamforming setting unit 220.

The sound beamforming setting unit 220 controls the microphone array 115 according to the selected voice recording mode to enable voice beamforming to be performed.

For example, when the general mode is selected, the sound beamforming setting unit 220 sets a beamforming direction to receive voice signals with respect to all directions, as illustrated in FIGS. 4 and 5. In such a case, the sound beamforming setting unit 220 enables a screen display unit, such as the touchscreen 160, to display a visual effect for a relevant voice beamforming direction in the general mode. When the interview mode is selected, the sound beamforming setting unit 220 sets the beamforming direction to a front direction of a microphone, such as the microphone array 115, as illustrated in FIGS. 6 and 7, and enables the screen display unit to display a visual effect for a relevant voice beamforming direction in the interview mode. In addition, when the dialog mode is selected, the sound beamforming setting unit 220 sets the beamforming direction to front and rear directions of the microphone, as illustrated in FIGS. 8 and 9, and enables the touchscreen 160 to display a visual effect for a relevant voice beamforming direction in the dialog mode.

Figure 3:
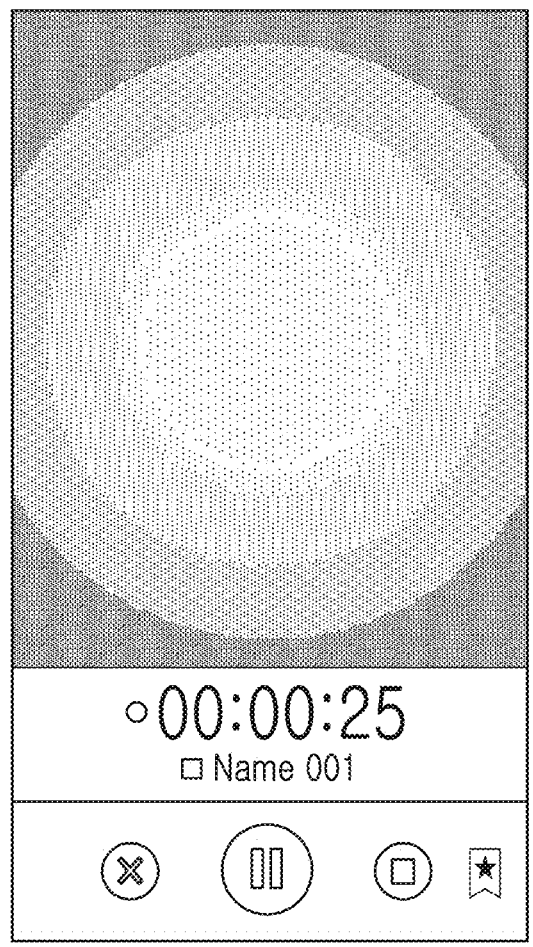
FIG. 3 illustrates a user interface for selecting a voice recording mode according to an embodiment of the present disclosure.

FIG. 3 illustrates a user interface for selecting a voice recording mode according to an embodiment of the present disclosure.

Referring to FIG. 3, a UI for selecting a voice recording mode desired by a user may be provided by a voice recording application.

In such a case, the voice recording mode may include a general mode, an interview mode, a dialog mode and a voice memo mode. The present disclosure is not limited to the embodiment and the voice recording mode may be defined as being subdivided to include at least four modes.

FIG. 4 illustrates a UI corresponding to a general mode of voice recording modes according to an embodiment of the present disclosure.

Referring to FIG. 4, information about a voice signal pattern corresponding to the general mode and characteristics of the general mode may be displayed.

For example, in an upper area of a screen, a sound beamforming pattern for enabling reception of voice signals incoming from all directions in the general mode is displayed and in a lower area of the screen, information indicating that there is no specific directionality is displayed so as to enable recording of voice signals from a plurality of users in the general mode, characteristics of microphones are set to merely eliminate ambient noise, and recording is then performed.

FIG. 5 illustrates a UI corresponding to a general mode of voice recording modes according to an embodiment of the present disclosure.

Referring to FIG. 5, a visual effect for a direction of voice incoming through a microphone in the general mode may be displayed. For example, a user may visually perceive that microphones receive voice signals incoming from all directions in the general mode.

FIG. 6 illustrates a user interface corresponding to an interview mode of voice recording modes according to an embodiment of the present disclosure.

Referring to FIG. 6, information about a voice signal pattern corresponding to the interview mode and characteristics of the interview mode may be displayed.

For example, in the upper area of the screen, a sound beamforming pattern for enabling reception of voice signals incoming from a front direction in the interview mode is displayed and in the lower area of the screen, information indicating that voice from a front speaking person is recorded and ambient noise as well as voice from a rear or side speaking person are suppressed for recording in the interview mode is displayed. That is, voice signals incoming from the front direction are amplified and signals received in directions other than the front direction are suppressed in the interview mode.

FIG. 7 illustrates a UI corresponding to an interview mode of voice recording modes according to an embodiment of the present disclosure.

Referring to FIG. 7, a visual effect for a direction of voice received through microphones in the interview mode may be displayed. For example, the user may visually perceive that the microphones receive and amplify voice signals from the front direction and suppresses signals received from directions other than the front direction, for example, rear and side directions, in the interview mode.

FIG. 8 illustrates a UI corresponding to a dialog mode of voice recording modes according to an embodiment of the present disclosure.

Referring to FIG. 8, information about a voice signal pattern corresponding to the dialog mode and characteristics of the dialog mode may be displayed.

For example, in the upper area of the screen, a sound beamforming pattern for enabling reception of voice signals from front and rear directions in the dialog mode is displayed and in the lower area of the screen, information indicating that voice from front and rear speaking persons is recorded and ambient noise as well as voice from a side speaking person are suppressed for recording in the dialog mode is displayed. That is, in the dialog mode, voice signals received from the front and rear directions are amplified and signals received from directions other than the front and rear directions, for example, a side direction, are suppressed.

FIG. 9 illustrates a UI corresponding to a dialog mode of voice recording modes according to an embodiment of the present disclosure.

Referring to FIG. 9, a visual effect for a direction of voice received through microphones in the dialog mode may be displayed. For example, the user may visually perceive that the microphones receive and amplify voice signals from front and rear directions and signals received from directions, for example, a side direction, other than the front and rear directions are suppressed in the dialog mode.

Figure 10:
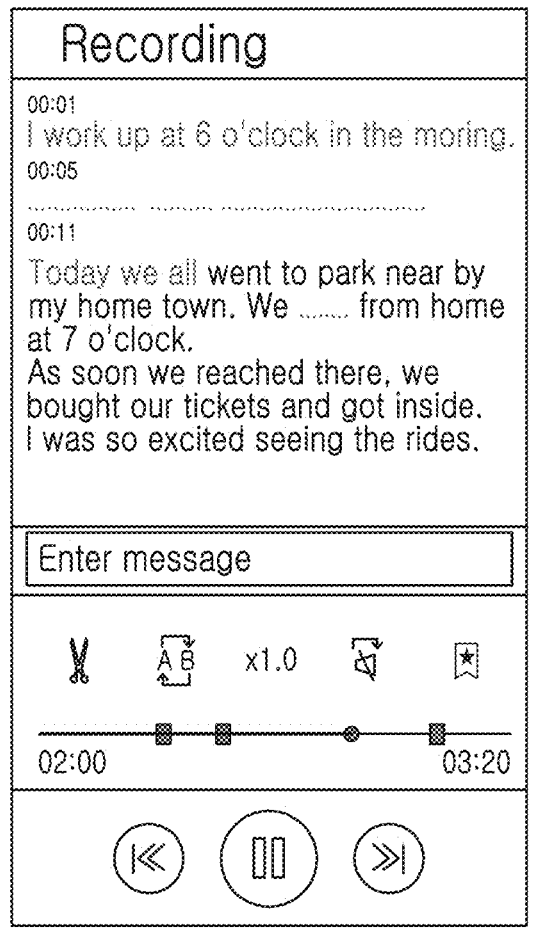
FIG. 10 illustrates a UI corresponding to a voice memo mode of voice recording modes according to an embodiment of the present disclosure.

FIG. 10 illustrates a UI corresponding to a voice memo mode of voice recording modes according to an embodiment of the present disclosure.

Referring to FIG. 10, when the voice memo mode is selected, voice signals are received from a predetermined voice beamforming direction and amplified. The amplified voice signals may be displayed in a text form through a Speech To Text (STT) function on a screen.

The predetermined voice beamforming direction may be a beamforming direction corresponding to the general mode, the interview mode, and/or the dialog mode.

According to an embodiment of the present disclosure, the predetermined voice beamforming direction may be a sound-source direction estimated by a method using a TDOA, a method using a steered beamformer, and/or a method using high resolution spectrum estimation.

Figure 11:
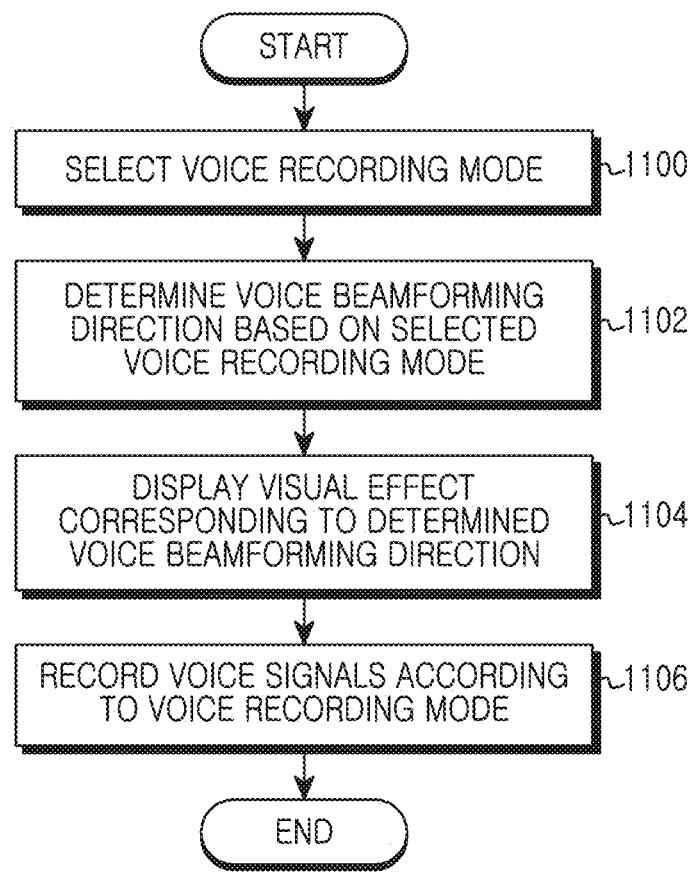
FIG. 11 is a flowchart illustrating a method for voice recording in an electronic device according to an embodiment of the present disclosure.

FIG. 11 is a flowchart illustrating a method for recording voice in an electronic device according to an embodiment of the present disclosure.

Referring to FIG. 11, in operation 1100, the electronic device may select a voice recording mode or receive a selection of a voice recording mode. For example, as illustrated in FIG. 3, the voice recording mode may include the general mode, the interview mode, the dialog mode, and the voice memo mode.

In operation 1102, the electronic device may determine a voice beamforming direction based on the selected voice recording mode. For example, when the general mode is selected, the beamforming direction is selected such that voice signals are received in all directions, as illustrated in FIGS. 4 and 5. When the interview mode is selected, the beamforming direction may be set to the front direction of a microphone, as illustrated in FIGS. 6 and 7. When the dialog mode is selected, the beamforming direction may be set to the front and rear directions of the microphone, as illustrated in FIGS. 8 and 9.

In operation 1104, the electronic device may display a visual effect corresponding to the determined voice beamforming direction.

For example, the electronic device may display a visual effect with respect to a direction of voice received through the microphone in the general mode, as illustrated in FIG. 5, a direction of voice received through the microphone in the interview mode, as illustrated in FIG. 7, or a direction of voice received through the microphone in the dialog mode, as illustrated in FIG. 9. When the voice memo mode is selected, voice signals from a predetermined voice beamforming direction are received and amplified. The amplified voice signals may be displayed in a text form through a STT function on a screen.

In operation 1106, the electronic device may record voice signals according to the voice recording mode.

According to an embodiment of the present disclosure, when at least one electronic device performs simultaneous recording, a function of analyzing the recorded voice data and automatically selecting a best recording for each speaking person is performed, thereby securing high-quality recording data upon simultaneous recording that may occur, for example, in a large conference hall. For example, a plurality of electronic devices, at their respective positions, perform sound beamforming in the direction of one speaking person to acquire voice recording data, and the electronic device that has acquired the voice recording data having a best recording quality may share the voice recording data with other electronic devices. According to an embodiment of the present disclosure, the plurality of electronic devices, at their respective positions, perform sound beamforming in the direction of one speaking person to acquire voice and exchange the acquired voice recording data with one another to store a plurality of pieces of voice recording data for the one speaking person.

Figure 12:
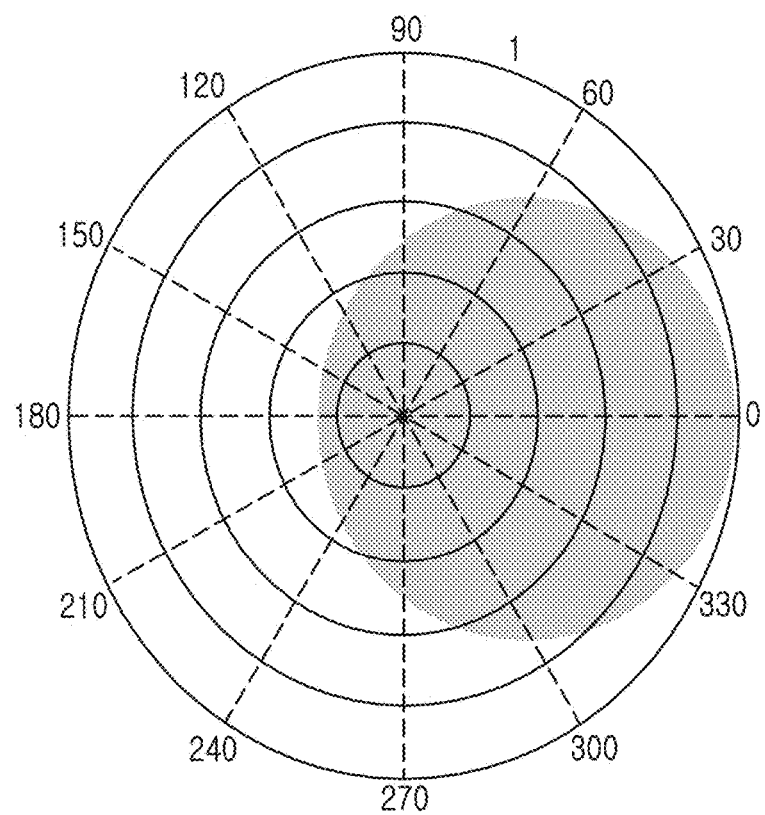
FIG. 12 illustrates an example of controlling a microphone according to a phase according to an embodiment of the present disclosure.

FIG. 12 illustrates an example of controlling a microphone according to a phase according to an embodiment of the present operation.

Referring to FIG. 12, relationships between a phase and voice recording modes are illustrated. For example, 0 degrees indicates a direction corresponding to the front of a user, 90 degrees and 270 degrees indicate directions corresponding to the sides of the user, such as the left side and/or the right side of the user, and 180 degrees indicates a direction corresponding to the rear of the user.

For example, a shaded circle, as shown in FIG. 12, represents voice beamforming of the 0-degree direction and corresponds to the interview mode for recording voice from a front user.

Although not illustrated, the voice beamforming of the 0-degree direction and a 180-degree direction may correspond to a dialog mode for recording only voice from the front user and a rear user.

Although the voice recording mode is illustrated as including the general mode, the interview mode, the dialog mode, and the voice memo mode, as illustrated in FIG. 3, an embodiment of the present disclosure is not limited to four modes including the general mode, the interview mode, the dialog mode and the voice memo mode, and rather, may include any suitable number and types of modes. For example, phases are finely divided and more than four voice recording modes may be defined based on the combinations of the finely-divided phases.

FIGS. 13A to 13C illustrate examples for processing voice signals according to voice recording modes according to an embodiment of the present disclosure.

Referring to FIGS. 13A to 13C, an example of performing voice beamforming according to a voice recording mode is illustrated. For example, when the voice recording mode is the interview mode, voice signals coming from the 0-degree direction are amplified in order to perform voice beamforming corresponding to the 0-degree direction, as illustrated in FIG. 13B, and voice signals incoming at phases other than the 0-degree phase direction, for example, from a −45-degree direction and a +45-degree direction, may be attenuated, as illustrated respectively in FIGS. 13A and 13C.

For example, voice signals incoming, from the 0-degree direction and through the microphone array 115 are processed without delay according to a predetermined signal processing in a mixer 1305, as illustrated in FIG. 13B. As illustrated in FIGS. 13A and 13B, voice signals incoming from the −45-degree direction and the +45-degree direction through the microphone array 115 are delayed before arrival and processed according to the signal processing in the mixer 1305.

In this case, one of delay-and-sum beamforming and weight-and-sum beamforming may be applied for the predetermined signal processing. The delay-and-sum beamforming refers to a method for applying and/or attenuating a signal in consideration of an arrival delay time, and the weight-and-sum beamforming refers to a method for applying and/or attenuating a signal by applying a weight to an important microphone in addition to consideration of the arrival delay time.

As shown in FIG. 13B, voice signals arriving from a sound source without delay through respective microphones are combined with each other and the gain is 3. In FIGS. 13A and 13B, voice signals that are delayed and arrive from the sound source through respective microphones are combined with each other and the gain is 1.

Although not illustrated, voice signals incoming from the 0-degree direction and the 180-degree direction are amplified and voice signals incoming at phases other than the 0-degree direction and the 180-degree direction may be attenuated in order to perform voice beamforming with respect to the 0-degree direction and the 180-degree direction when the voice recording mode is the dialog mode.

The methods according to an embodiment described in the claims and/or specification of the present disclosure may be implemented by hardware, software, or a combination thereof.

When the methods are implemented by software, a computer-readable storage medium may be provided to store at least one program which may also be referred to as at least one software module. The at least one program stored in the computer-readable storage medium may be configured for execution by at least one processor in an electronic device, and the at least one processor may be a hardware device, such as a microcontroller, an Integrated Circuit (IC), a computer chip, an Erasable Programmable Read Only Memory (EPROM), or any other similar and/or suitable hardware device and/or hardware element. The at least one program may include instructions for causing the electronic device to execute the methods according to an embodiment described in the claims and/or specification of the present disclosure.

The at least one program, which are also be referred to as software modules, and/or software, may be stored in a storage device, such as a Random Access Memory (RAM), a non-volatile memory including a flash memory, a Read Only Memory (ROM), an Electrically EPROM (EEPROM), a magnetic disc storage device, a Compact Disc (CD)-ROM, Digital Versatile Discs (DVDs), and/or other types of optical storage devices, and a magnetic cassette. Alternatively, the at least one program can be stored in a memory configured in a combination of some or all of these storage devices. Also, a plurality of respective memories may be provided.

Also, the at least one programs may be stored in an attachable storage device that accesses the electronic device via a communication network, such as the Internet, an Intranet, a Local Area Network (LAN), a Wide LAN (WLAN), and a Storage Area Network (SAN), and/or a communication network configured in combination of these. This storage device may access the electronic device via an external port.

Also, a separate storage device on a communication network may access a portable electronic device.

As described above, an electronic device equipped with a plurality of microphones provides voice recording modes suitable for respective situations and performs sound beamforming in a user's desired direction suitably for each situation, thereby acquiring corresponding voice recording data.

In addition, a UI suitable for a current voice recording environment, so that a user intuitionally perceives which voice recording environment, is provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device including a plurality of microphones, the method comprising:
   receiving an input for selecting a voice recording mode among a plurality of voice recording modes, wherein each of the plurality of voice recording modes respectively corresponds to at least one voice beamforming direction determined based on a number of at least one sound source and a location of each of the at least one sound source;
   controlling a microphone array based on the at least one voice beamforming direction corresponding to the selected voice recording mode, wherein the microphone array includes the plurality of microphones;
   recording at least one sound signal by using the controlled microphone array; and
   displaying a visual effect for indicating that the at least one sound signal is being recorded based on the at least one voice beamforming direction.

2. The method of claim 1, wherein the visual effect is displayed during recording of the at least one sound signal or before recording of the at least one sound signal.

3. The method of claim 1, wherein the plurality of voice recording modes comprises a general mode for recording at least one sound signal incoming from omni-directions, an interview mode for recording at least one sound signal incoming from a sound source disposed in front of the electronic device, a dialog mode for recording at least one sound signal incoming from a first sound source disposed in front of the electronic device and a second sound source disposed in rear of the electronic device, and a voice memo mode for converting at least one sound signal into a text and displaying the text.

4. The method of claim 1, further comprising:
   determining a speaking person direction in which a speaking person is disposed;
   selecting a speaker corresponding to the determined speaking person direction from among a plurality of speakers of the electronic device; and
   outputting the at least one sound signal during recording through the selected speaker.

5. An electronic device comprising:
   a plurality of microphones;
   a mode selection unit configured to receive an input for selecting a voice recording mode among a plurality of voice recording modes, wherein each voice recording mode respectively corresponds to at least one voice beamforming direction determined based on a number of at least one sound source and a location of each of the at least one sound source;
   a sound beamforming setting unit configured to control a microphone array based on the at least one voice beamforming direction corresponding to the selected voice recording mode, wherein the microphone array includes the plurality of microphones;

a control unit configured to record at least one sound signal by using the controlled microphone array; and a display unit configured to display a visual effect for indicating that the at least one sound signal is being recorded based on the at least one voice beamforming direction.

6. The electronic device of claim 5, wherein the display unit is further configured to display the visual effect during recording of the at least one sound signal or before recording of the at least one sound signal.

7. The electronic device of claim 5, wherein each of the plurality of voice recording modes is one of a general mode for recording at least one sound signal incoming from omni-directions, an interview mode for recording at least one sound signal incoming from a sound source disposed in front of the electronic device, a dialog mode for recording at least one sound signal incoming from a first sound source disposed in front of the electronic device and a second sound source disposed in rear of the electronic device, and a voice memo mode for converting at least one sound signal into a text and displaying the text.

8. The electronic device of claim 5, wherein the control unit is further configured to:
   determine a direction in which a speaking person exists,
   select a speaker corresponding to the determined speaking person direction among a plurality of speakers of the electronic device, and
   output the at least one sound signal during recording through the selected speaker.

9. The electronic device of claim 5, wherein the sound beamforming setting unit is further configured to control a phase of the microphone array according to the determined at least one voice beamforming direction.

10. An electronic device including a plurality of microphones, the electronic device comprising:
    at least one processor configured to execute at least one program;
    a memory configured to store the at least one program; and
    a display unit;
    wherein the at least one program comprises instructions for:
      receiving an input for selecting a voice recording mode among a plurality of voice recording modes, wherein each voice recording mode respectively corresponds to at least one voice beamforming direction determined based on a number of at least one sound source and a location of each of the at least one sound source;
      controlling a microphone array based on the at least one voice beamforming direction corresponding to the selected voice recording mode, wherein the microphone array includes the plurality of microphones;
      recording at least one sound signal by using the controlled microphone array; and
      displaying a visual effect for indicating that the at least one sound signal is being recorded based on the at least one voice beamforming direction.

11. The electronic device of claim 10, wherein the display is further configured to display the visual effect during recording of the at least one sound signal or before recording of the at least one sound signal.

12. The electronic device of claim 10, wherein the plurality of voice recording modes comprises a general mode for recording at least one sound signal incoming from omni-directions, an interview mode for recording at least one sound signal incoming from a sound source disposed in front of the electronic device, a dialog mode for recording at least one sound signal incoming from a first sound source disposed in front of the electronic device and a second sound source disposed in rear of the electronic device, and a voice memo mode for converting at least one sound signal into a text and displaying the text.

13. The electronic device of claim 10, wherein the at least one program further comprises instructions to:
    perform sound beamforming on one speaking person on which at least one other electronic device performs sound beamforming and acquiring a plurality of pieces of voice recording data for the one speaking person; and
    select and store voice recording data having high voice quality from among the plurality of pieces of voice recording data for the one speaking person.

* * * * *